(12) United States Patent
Wojatzki et al.

(10) Patent No.: US 8,573,698 B2
(45) Date of Patent: Nov. 5, 2013

(54) ADJUSTABLE SEAT TRACK HAVING IMPROVED TRACK ENGAGEMENT STRUCTURE

(75) Inventors: Michael Wojatzki, Ennigerloh (DE); Hans-peter Mischer, Bad Meinberg (DE); Klaus Walter, Paderborn (DE); Marc Laumeier, Langenberg (DE); Andre Schebaum, Steinhagen (DE); Joerg Sternberg, Rheda-wiedenbru (DE); Michael Maddelein, Northville, MI (US)

(73) Assignee: Lear Corporation, Southfield, MI (US)

( * ) Notice: Subject to any disclaimer, the term of this patent is extended or adjusted under 35 U.S.C. 154(b) by 294 days.

(21) Appl. No.: 13/123,869

(22) PCT Filed: Dec. 18, 2009

(86) PCT No.: PCT/US2009/068697
§ 371 (c)(1),
(2), (4) Date: Apr. 12, 2011

(87) PCT Pub. No.: WO2010/080597
PCT Pub. Date: Jul. 15, 2010

(65) Prior Publication Data
US 2011/0193389 A1 Aug. 11, 2011

Related U.S. Application Data

(60) Provisional application No. 61/139,143, filed on Dec. 19, 2008.

(51) Int. Cl.
*A47C 1/00* (2006.01)
*F16M 13/00* (2006.01)

(52) U.S. Cl.
USPC .......... 297/344.1; 248/420; 248/429

(58) Field of Classification Search
USPC .......... 297/344.1, 337; 248/420, 429
See application file for complete search history.

(56) References Cited

U.S. PATENT DOCUMENTS

| | | | | |
|---|---|---|---|---|
| 4,209,159 A | * | 6/1980 | Becker et al. | 248/430 |
| 4,730,804 A | * | 3/1988 | Higuchi et al. | 248/429 |

(Continued)

FOREIGN PATENT DOCUMENTS

| | | |
|---|---|---|
| CN | 101007512 A | 8/2007 |
| CN | 101130346 A | 2/2008 |

(Continued)

OTHER PUBLICATIONS

International Search Report to PCT/US2009/068697 dated Feb. 24, 2010.

(Continued)

*Primary Examiner* — Sarah B McPartlin
(74) *Attorney, Agent, or Firm* — MacMillan, Sobanski & Todd, LLC

(57) ABSTRACT

A seat adjustment apparatus comprises a first rail (24) and a second rail (26) each having a plurality of openings that extend along a longitudinal axis, the openings being defined by spaced-apart locking surfaces. A locking mechanism having first (56) and second (58) locking portions is configured to engage the first and second rails. The first (56) and second (58) locking portions are selectively rotatable between a released position and a locked position. In the locked position, the first and second locking portions are configured for relative axial movement along the longitudinal axis such that the interaction of the first and second locking portions of the locking mechanism with the spaced-apart locking surfaces of the openings of the first and second rails attenuates longitudinal freeplay therebetween.

20 Claims, 8 Drawing Sheets

(56) References Cited

U.S. PATENT DOCUMENTS

| | | | |
|---|---|---|---|
| 5,167,393 A | 12/1992 | Hayakawa et al. | |
| 5,772,173 A | 6/1998 | Couasnon | |
| 5,813,648 A | 9/1998 | Moradell et al. | |
| 5,918,847 A | 7/1999 | Couasnon | |
| 6,322,035 B1 | 11/2001 | D'Antimo et al. | |
| 6,349,914 B1 | 2/2002 | Yoshida et al. | |
| 6,354,553 B1 * | 3/2002 | Lagerweij et al. | 248/430 |
| 6,637,712 B1 | 10/2003 | Lagerweij | |
| 6,843,532 B2 | 1/2005 | Borbe et al. | |
| 7,000,880 B2 | 2/2006 | Jaudouin | |
| 7,293,752 B2 | 11/2007 | McCulloch et al. | |
| 7,328,877 B2 | 2/2008 | Yamada et al. | |
| 7,331,558 B2 | 2/2008 | Jeong | |
| 7,431,256 B2 | 10/2008 | Yamada et al. | |
| 7,506,856 B2 | 3/2009 | Ikegaya et al. | |
| 7,523,913 B2 | 4/2009 | Mizuno et al. | |
| 7,604,214 B2 | 10/2009 | Kojima et al. | |
| 8,215,602 B2 * | 7/2012 | Walter et al. | 248/424 |
| 2004/0188586 A1 | 9/2004 | Jaudouin | |
| 2007/0090260 A1 | 4/2007 | Kojima | |
| 2008/0231101 A1 | 9/2008 | Sakakibara et al. | |

FOREIGN PATENT DOCUMENTS

| | | |
|---|---|---|
| DE | 10039511 A1 | 2/2002 |
| EP | 0094438 A1 | 11/1983 |
| FR | 2852896 A1 | 10/2004 |

OTHER PUBLICATIONS

Chinese Search Report, Application No. CN 2009801496389 dated Feb. 7, 2013.

* cited by examiner

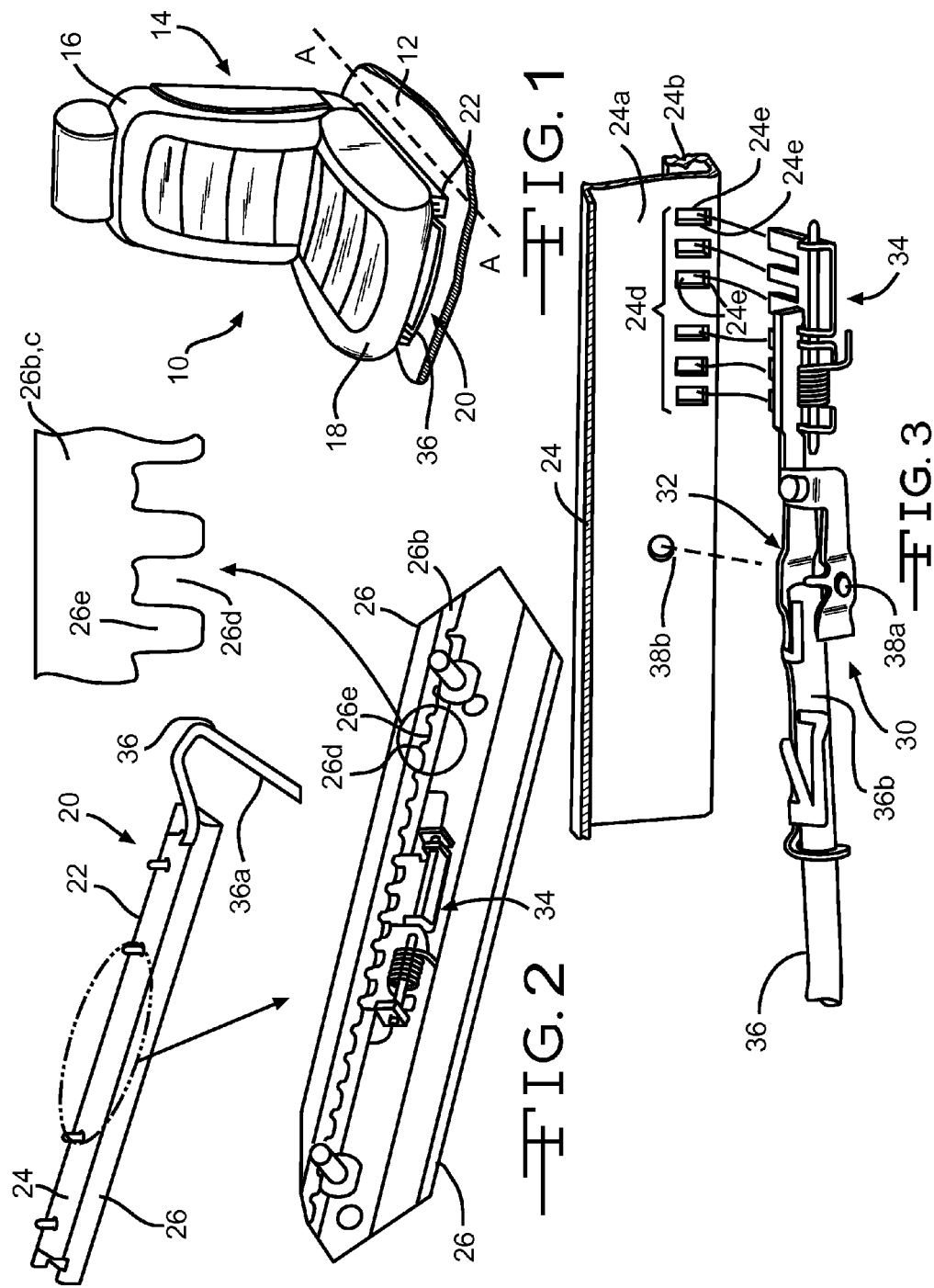

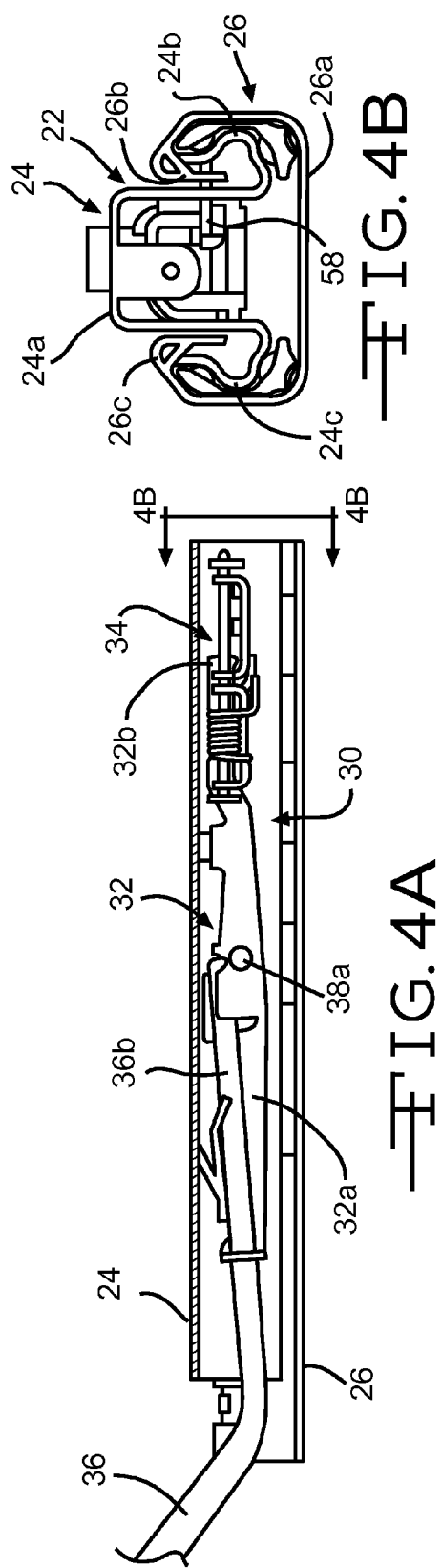
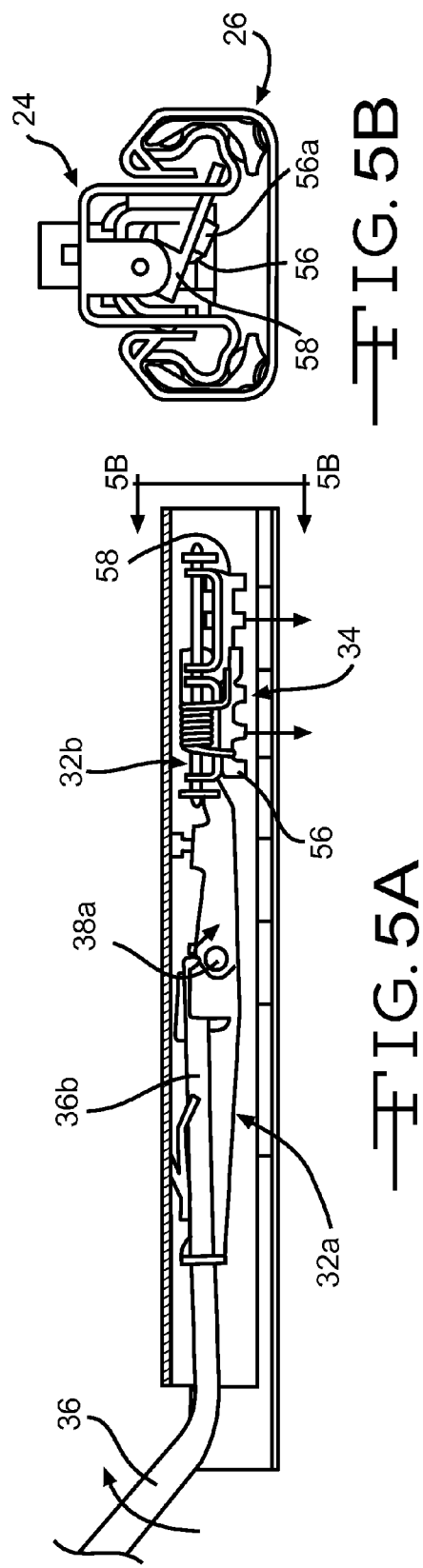

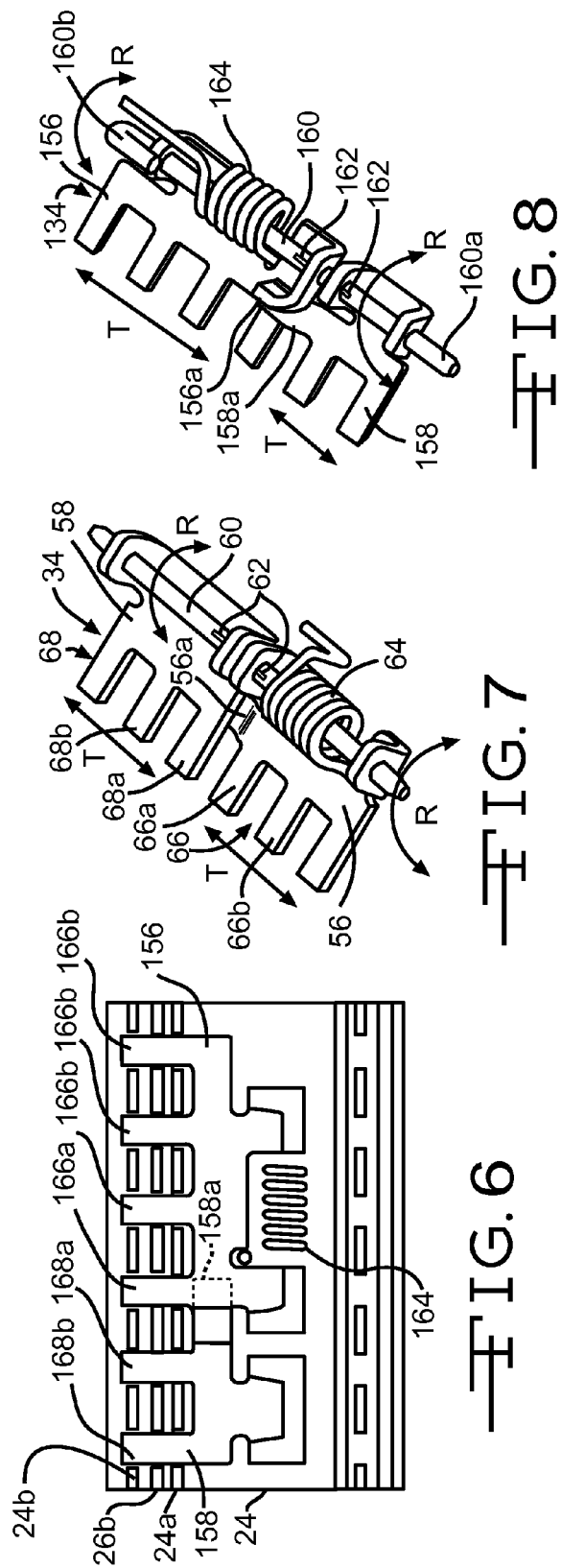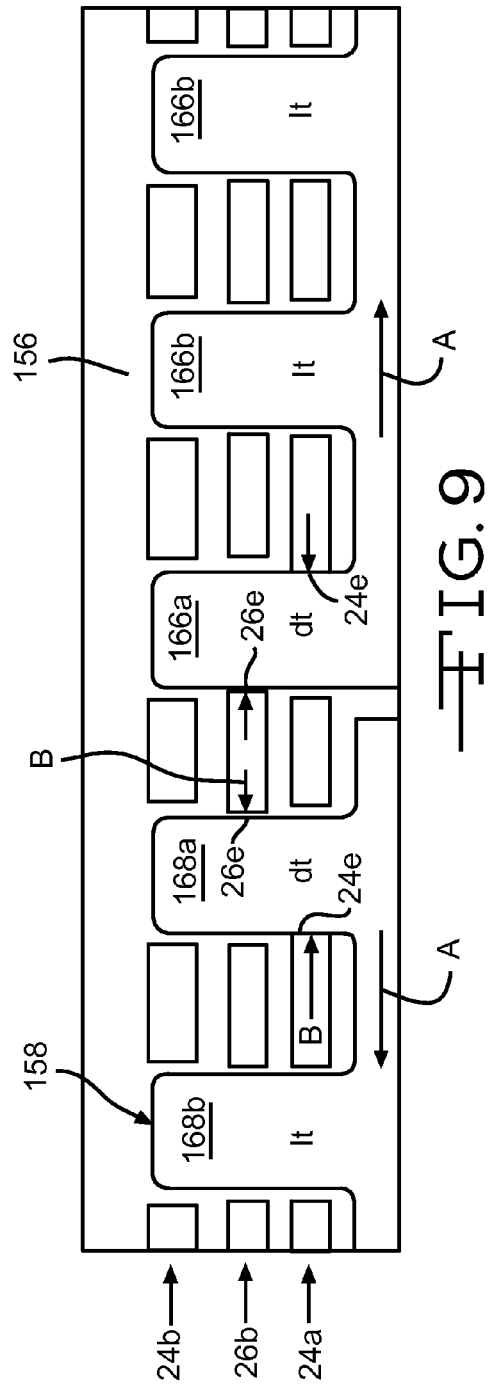

ADJUSTABLE SEAT TRACK HAVING IMPROVED TRACK ENGAGEMENT STRUCTURE

CROSS-REFERENCE TO RELATED APPLICATIONS

This application claims the benefit of U.S. Provisional Application No. 61/139,143, filed Dec. 19, 2008, the disclosure of which is incorporated herein by reference.

BACKGROUND OF THE INVENTION

This invention relates in general to seat track assemblies for adjusting the position of a seat relative to a surrounding structure, such as a vehicle. In particular, this invention relates to an improved latch mechanism for seat track assemblies.

Seat track assemblies, particularly those used in vehicular applications, are provided to permit an occupant to position a seat relative to another structure, such as a steering wheel or a dashboard. Seat track assemblies are often a pair of longitudinally oriented tracks or rails that are telescopically engaged with each other. One rail is mounted to a relatively stationary structure, such as a vehicle floor pan. The other rail engages the seat and is moveable relative to the stationary rail. The seat track assemblies are also provided with latch assemblies that permit the desired seat position to be selectively fixed.

Many seat track assemblies employ openings that are formed through the moveable and stationary rails. The openings cooperate with portions of the latch assembly to fix the relative position of the rails. The latch may have projections that engage the openings to provide a positive engagement. Often, the fit between the openings and the engaged portions of the latch assembly may have looseness. The looseness may result in residual movement or freeplay that results in an objectionable noise or vibration. Thus, it would be desirable to provide a latch mechanism for a seat track assembly that reduces or eliminates a freeplay condition between latched seat rails.

SUMMARY OF THE INVENTION

This invention relates to seat track latching mechanisms, and more particularly, to seat track latching mechanisms that substantially reduce or eliminate free play between telescopically engaged, longitudinally adjustable seat rails.

A seat adjustment apparatus comprises a first rail having a plurality of openings that extend along a longitudinal axis. The openings are defined by spaced-apart locking surfaces. A second rail includes a plurality of complementary openings that extend along the longitudinal axis. The complementary openings are defined by spaced-apart locking surfaces. A locking mechanism having first and second locking portions is configured to engage the first and second rails. The first and second locking portions are selectively rotatable between a released position and a locked position. In the released position, the first and second rails can move freely relative to one another along the longitudinal axis. In the locked position, each of the first and second locking portions includes a plurality of teeth extending into the selected openings and complementary openings in the first and second rails to maintain the first rail in a selected position relative to the second rail. The first and second locking portions are further configured for relative axial movement along the longitudinal axis as the locking mechanism is moved from the released position to the locked position such that at least one of the teeth of each of the first and second locking portions are engageable with a respective locking surface to attenuate longitudinal freeplay between the first and second rails.

Various aspects of this invention will become apparent to those skilled in the art from the following detailed description of the preferred embodiment, when read in light of the accompanying drawings.

BRIEF DESCRIPTION OF THE DRAWINGS

FIG. 1 is a perspective view of a seat having an embodiment of an adjustable seat track assembly.

FIG. 2 is a perspective view of an embodiment of a seat track assembly having a seat track latch and includes an enlarged perspective view, in partial cross section, of a portion of the seat track assembly showing a latch assembly.

FIG. 3 is an exploded view, in partial cross section, of a portion of the seat track latch assembly and actuator mechanism.

FIG. 4A is a side elevation view, in partial cross section, of the seat track and latch assembly of FIG. 3 in a locked position.

FIG. 4B is an end elevation view, in partial cross section, of the seat track and latch assembly of FIG. 4A.

FIG. 5A is a side elevation view, in partial cross section, of the seat track and latch assembly of FIG. 3 in a released position.

FIG. 5B is an end elevation view, in partial cross section, of the seat track and latch assembly of FIG. 5A.

FIG. 6 is a top view, in partial cross section, of an embodiment of a seat latch in engagement with portions of the seat track.

FIG. 7 is an embodiment of a latch plate assembly.

FIG. 8 is another embodiment of a latch plate assembly.

FIG. 9 is an enlarged view of FIG. 6 showing a portion of the seat latch engaged with the seat track.

DETAILED DESCRIPTION OF THE PREFERRED EMBODIMENT

Figure 10:
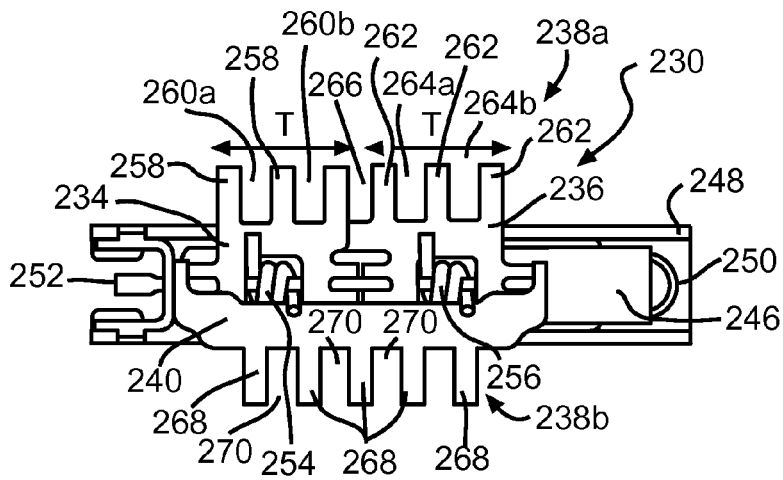
FIG. 10 is yet another embodiment of a latch assembly including an embodiment of an actuation mechanism, mounting mechanism, and latch plate assembly.

Referring now to FIGS. 2-5B, there is illustrated the seat track assembly 22 where the first portion 24 is a movable rail that is adapted to engage the seat bottom 18, or any other suitable portion, of the seat assembly 10. The second portion 26 of the seat track assembly 22 is configured as a stationary rail that is adapted to engage the floor 12, or any other suitable structure, of the vehicle. The moveable rail 24 is configured to move longitudinally along the track axis A relative to the stationary rail 26. The moveable rail 24 is illustrated having a generally "U"-shaped section 24a and opposing, outwardly positioned, and spaced-apart walls 24b and 24c. The U-shaped section and at least one of the spaced apart walls 24b and 24c include a plurality of openings 24d formed therethrough. The shape of the openings 24d is defined by spaced-apart surfaces 24e. The spaced-apart surfaces 24e of each opening 24d cooperate to define a perimeter of each opening. The openings 24d are illustrated as rectangular openings, though any shape suitable for a seat adjustment apparatus may be used.

Referring now to FIGS. 2-5B, there is illustrated the seat track assembly 22 where the first portion 24 is a movable rail that is adapted to engage the seat bottom 18, or any other suitable portion, of the seat assembly 10. The second portion 26 of the seat track assembly 22 is configured as a stationary rail that is adapted to engage the floor 12, or any other suitable structure, of the vehicle. The moveable rail 24 is configured to move longitudinally along the track axis A relative to the stationary rail 26. The moveable rail 24 is illustrated having a generally "U"-shaped section 24a and opposing, outwardly positioned, and spaced-apart walls 24b and 24c. The U-shaped section and at least one of the spaced apart walls 24b and 24c include a plurality of openings 24d formed therethrough. The shape of the openings 24d is defined by spaced-apart surfaces 24e. The spaced-apart surfaces 24e of each opening 24d cooperate to define a perimeter of each opening The openings 24d are illustrated as rectangular openings, though any shape suitable for a seat adjustment apparatus may be used.

The actuation mechanism 32 and the latch plate assembly 34, as shown in FIGS. 4A-5B, are disposed within the space between the engaged moveable and stationary rails 24 and 26 and are mounted on the moveable rail 24. This arrangement permits a more compact assembly for easier packaging within the vehicle. The actuation mechanism 32 is moveable to articulate the latch plate assembly 34 between a locked position, shown in FIGS. 4A and 4B, and a released position, shown in FIGS. 5A and 5B. Movement of the actuation mechanism 32 positions the latch plate assembly 34 into and out of engagement with at least the openings 26d of the stationary rail 26, as shown in FIGS. 4B and 5B. The actuation mechanism 32 engages an actuation handle 36, illustrated as a towel bar. The towel bar 36 is illustrated having a handhold portion 36a and an actuator interface portion 36b. The towel bar 36, however, may be any lever, cable, actuator, or other structure that can articulate either the actuation mechanism 32, or the latch plate assembly 34 directly, between the locked position and the released position relative to the rails 24 and 26.

The actuation mechanism 32 and the latch plate assembly 34, as shown in FIGS. 4A-5B, are disposed within the space between the engaged moveable and stationary rails 24 and 26 and is mounted on the moveable rail 24. This arrangement permits a more compact assembly for easier packaging within the vehicle. The actuation mechanism 32 is moveable to articulate the latch plate assembly 34 between a locked position, shown in FIGS. 4A and 4B, and a released position, shown in FIGS. 5A and 5B. Movement of the actuation mechanism 32 positions the latch plate assembly 34 into and out of engagement with at least the openings 26d of the stationary rail 26, as shown in FIGS. 4B and 5B. The actuation mechanism 32 engages an actuation handle 36, illustrated as a towel bar. The towel bar 36 is illustrated having a handhold portion 36a and an actuator interface portion 36b. The towel bar 36, however, may be any lever, cable, actuator, or other structure that can articulate either the actuation mechanism 32, or the latch plate assembly 34 directly, between the locked position and the released position relative to the rails 24 and 26.

Figure 16:
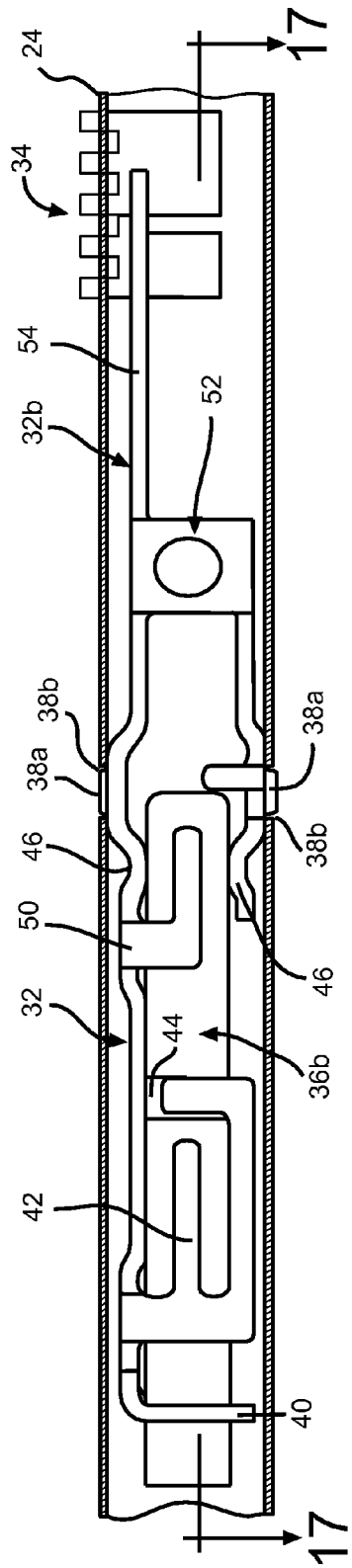
FIG. 16 is a schematic top view of an embodiment of an actuation mechanism mounted to a seat track.
Figure 17:
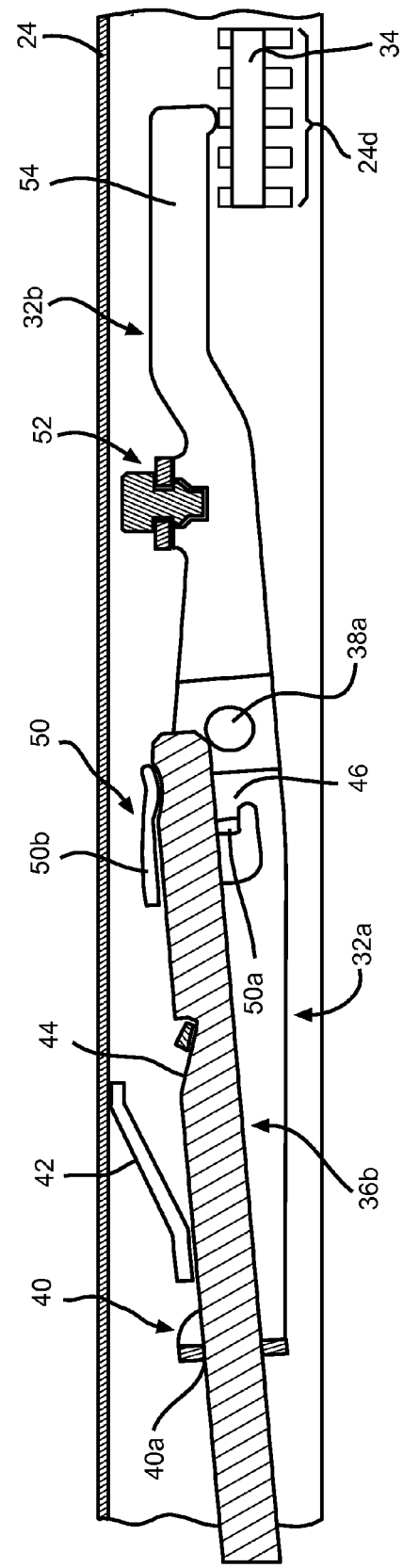
FIG. 17 is a schematic side view of the actuation mechanism of FIG. 16.

Referring now to FIGS. 16 and 17, the actuation mechanism 32 is illustrated having a handle mount portion 32a, a latch plate interface portion 32b, and two spaced apart pivot points 38a. The pivot points 38a are illustrated as round, outwardly projecting buttons that extend through two corresponding pivot apertures 38b formed into the moveable rail 24. Though shown and described as cooperating protrusions and apertures, the actuation mechanism 32 may pivot relative to the moveable rail 24 by way of any suitable structure such as, for example, a hinge, an axle, bearings, bushings, and the like.

The handle mount portion 32a of the actuation mechanism 32 is configured to engage and retain the actuator interface portion 36b of the towel bar 36. The handle mount portion 32a includes a front guide 40, a return spring 42, a handle lock 44, and pivot retainers 46. The front guide 40 is shown engaging the actuator interface portion 36b of the towel bar 36 at a forward most point of the actuation mechanism 32. The front guide 40 is shown having an aperture 40a formed therethrough and serves to orient the towel bar 36 with the handle mount portion 32a. The front guide 40 further provides a first reaction point for the towel bar 36 to articulate the latch plate interface portion 32b when the towel bar 36 is moved to the release position.

The return spring 42 is illustrated as a cantilever spring that is integrally formed with the actuation mechanism 32. The return spring 42 biases the actuation mechanism 32 away from the latch assembly such that the latch plate assembly 34 is free to be biased toward the locked position. It should be understood that any applicable resilient member may be used to bias the actuation mechanism 32 away from the latch assembly 34. The handle lock 44 is a resilient element that is biased toward engagement with a locking detent 48 formed in the actuator interface portion 36b. In the illustrated embodiment, the handle lock 44 snaps into engagement with the locking detent 48 as the actuator interface portion 36b of the towel bar 36 is inserted into the handle mount portion 32a of the actuation mechanism 32. However, the handle lock 44 and the cooperating locking detent 48 may be configured as any suitable retaining mechanism, including a fastener and aperture, a resiliently biased button and detent, and the like.

As the towel bar 36 is pushed into engagement with the actuation mechanism 32, the actuator interface portion 36b of the towel bar 36 makes contact with the pivot retainers 46.

The pivot retainers 46 are spaced apart regions that frictionally engage the sides of the towel bar 36. The towel bar 36 spreads the pivot retainers 46 apart and further forces the pivot points 38a to remain engaged within the pivot apertures 38b. Once the towel bar 36 is engaged with the actuation mechanism 32, a rear guide 50 engages the end of the actuator interface portion 36b of the towel bar 36. The rear guide 50 is illustrated having a rear reaction point 50a and a retaining element 50b. The rear guide 50, however, may be configured as any structure that cooperates with the towel bar 36 to articulate the actuation mechanism 32. The front and rear guides 40 and 50 provide reaction points that transfer the movement of the towel bar 36 to the actuation mechanism 32.

The latch plate interface portion 32b of the actuation mechanism 32 includes an actuator end stop 52 and a latch plate actuation arm 54. Though illustrated as having one latch plate actuation arm 54, a pair of arms may be provided, such as for latch plate assembly embodiments that will be described below. As the handle mount portion 32a of the actuation mechanism 32 is rotated about the pivot points 38a, the latch plate actuation arm 54 rotates into contact with the latch plate assembly 34 to move the latch plate assembly 34 to the release position. When the actuation mechanism 32 is positioned in the locked position, i.e. when the latch plate assembly 34 is in the locked position, the end stop 52 abuts a portion of the U-shaped section 24a of the moveable rail 24. The end stop 52 is illustrated as a rubber bumper that contacts the upper portion of the moveable rail 24 to limit rotational movement of the actuation mechanism 32.

Referring now to FIG. 7, there is illustrated an enlarged view the seat track latch assembly 34. The latch assembly 34 is illustrated having first and second latch plates 56 and 58, respectively. Though shown as having two latch plates 56 and 58, the latch assembly 34 may have more than two plates, if desired. The latch plates 56 and 58 are supported for rotational movement and translational movement by a hinge pin 60. The latch plates 56 and 58 may be free to slide on the hinge pin 60 in order to translate in a direction parallel to track axis "A", as shown by arrows "T". The latch plates 56 and 58 may translate apart or toward each other. The latch plates 56 and 58 also rotate about the hinge pin 60, as shown by arrows "R". The latch plates 56 and 58 are configured both to rotate and translate relative to one another and to rotate together, as required by the specific orientations of the openings 24d of the moveable rail 24 relative to the openings 26d of the stationary rail 26.

In the embodiment illustrated in FIGS. 7 and 18-20, the hinge pin 60 includes retention tabs 62 that limit the translational movement of the latch plates 56 and 58 along the hinge pin 60. The retention tabs 62 are illustrated as localized upset regions of the hinge pin 60 that abut the pivot mounting portion of the latch plates 56 and 58. Alternatively, the retention tabs 62 may be a separate component such as, for example, a snap ring, a retaining nut, a spring clip, and the like. A resilient member 64 biases the plates 56 and 58 into the locked position with the moveable rail 24 and the stationary rail 26. The resilient member 64 is illustrated as a coil spring but may be configured as any suitable resilient device such as, for example, a hair pin spring, an elastomeric spring, a torsion bar spring, and the like.

The latch plates 56 and 58 include a plurality of projecting teeth, shown generally at 66 and 68, respectively. The projecting teeth 66 and 68 are configured to engage the openings 24d and 26d that are aligned when the seat 14 is in the desired longitudinal use position. The projecting teeth 66 are illustrated having generally parallel sides, however, the sides may be tapered if desired. In the illustrated embodiment of FIG. 5A, the teeth 66 of the master plate 56 are equal in number to the teeth 68 of the slave plate teeth 58, though such is not required.

The latch plates 56 and 58 include a plurality of projecting teeth, shown generally at 66 and 68, respectively. The projecting teeth 66 and 68 are configured to engage the openings 24d and 26d that are aligned when the seat 14 is in the desired longitudinal use position, as shown in FIG. 6A. The projecting teeth 66 are illustrated having generally parallel sides, however, the sides may be tapered if desired. In the illustrated embodiment of FIG. 5A, the teeth 66 of the master plate 56 are equal in number to the teeth 68 of the slave plate teeth 58, though such is not required.

The master plate teeth 66 may be comprised of drive teeth 66a and load teeth 66b. The master plate 56 and the slave plate 58 may each have one drive tooth 66a and 68a and one load tooth 66b and 68b, though any number of drive and load teeth may be provided. When moved to the locked position, the teeth 66a and 66b extend into the aligned openings 24d and 26d of the rails 24 and 26. The drive tooth 66a is configured to engage at least one of the side surfaces 24e of the openings 24d and out least one of the sides 26e of the openings 26d. Such contact of the teeth 66a to the side surfaces of the openings 24d and 26d eliminates the freeplay relative movement between the moveable and stationary rails 24 and 26 when in the locked position. The slave plate teeth 68 may also be configured similarly with drive teeth 68a and load teeth 68b that are configured to extend into the openings 24d and 26d of the rails 24 and 26.

Referring now to FIG. 8, there is illustrated another embodiment of a latch plate assembly, indicated generally at 134. The latch plate assembly 134 includes a master plate 156 and a slave plate 158. The master plate 156 includes a drive element 156a that engages a driven element 158a of the slave plate 158. Alternatively, the drive element 156a may engage any portion of the slave plate 158. The master and slave plates 156 and 158 are supported for rotational and translational movement by a hinge pin 160. The hinge pin 160 includes a straight end 160a and a "J"-hook end 160b. A clearance exists between the drive element 156a and the driven element 158a such that the latch plates 156 and 158 may also translate in a direction parallel to track axis "A", as shown by arrows "T", similar to latch plates 56 and 58. The latch plates 156 and 158 may translate apart from or toward each other. The plates 156 and 158 also rotate about the hinge pin 160, as shown by arrows "R".

In another embodiment of the latch assembly 134, the clearance between the drive element 156a and the driven element 158a may be sufficiently large to permit the latch plates 156 and 158 may both to rotate and translate relative to one another, as required by the specific orientations of the moveable rail 24 relative to the stationary rail 26. Alternatively, the clearance may be small such that the master and slave plates 156 and 158 generally rotate together and are free to translate relative to one another. The master plate 156 is acted upon by a resilient element 164 and is biased into an engagement position with the moveable and stationary rails 24 and 26. The master plate 156 subsequently drives the slave plate 158 into the engagement position with the rails 24 and 26 similar to the latch plate assembly 34, described above. The latch plates 156 and 158 may be retained onto the hinge pin 160 by optional retention tabs 162. The optional retention tabs 162 are similar to retention tabs 62 described above.

The master plate 156 is illustrated having four teeth 166 and the slave plate 158 is illustrated having two teeth 168. However, the master and slave plates 156 and 158 may have any number of teeth. The mater plate teeth 166 are provided as drive teeth 166a and load teeth 166b, similar in function to the drive and load teeth 66a and 66b above. Likewise, the slave plate 158 may include both drive and load teeth 168a and 168b, similar to the drive and load teeth 68a and 68b above.

As shown in FIGS. 6 and 9 and with reference to the second embodiment latch plate assembly 134, the drive teeth 166a of the master plate 156 are configured to make initial contact with one of the spaced apart side surfaces 24e of the openings 24d that are formed through the U-shaped section 24a and the spaced-apart walls 24b and 24c of the moveable rail 24. The drive teeth 166a further make secondary contact with the sides of the teeth 26e as the drive teeth 166a extend through the openings 26d formed on one of the opposing spaced-apart walls 26b and 26c of the stationary rail 26. As shown in FIG. 9, the load teeth 166b extend into the openings 24d and 26d without contacting one or both of the side surfaces 24e and the teeth 26e. The load teeth 166b may contact one or both of the side surfaces 24e and the teeth 26e, if so configured. The drive tooth 166a of the master plate 156 may be spaced apart from the load teeth with a different pitch, or spaced dimension, that the load teeth 166b are spaced apart from each other. Similarly, the drive tooth 168a of the slave plate 158 may be spaced apart from an adjacent load tooth 168b differently than the spacing of the load teeth 168b to each other.

The embodiments of the latch plate assemblies 34 and 134 described above may also be used in a tandem orientation. Such a tandem orientation may include latch plates, configured as master and slave plates, that are spaced apart from the master and slave plates 56 and 58 or the master and slave plates 156 and 158. The tandem oriented master and slave plates may pivot about the same hinge pin, for example hinge pin 60, though such is not required. In such a tandem arrangement, a resilient member, similar to resilient member 64 may be configured to apply a biasing force between the tandem oriented latch plates. Alternatively, two resilient members may separately bias the tandem latch plates into a locked position. The separate resilient members may react against a portion of the rail that supports the latch assembly, such as the U-shaped section 24a of the moveable rail 24.

The following description of operation is for illustration purposes only. The sequence of specific component interactions may be other than that described herein. As the drive teeth 166a enter into the openings 24d and 26d, contact is first made between one drive tooth 166a and, for example, the side of the tooth 26e in the spaced-apart wall 26b of the stationary rail 26. As the drive teeth 166a continue to rotate into the locked position, contact with the tapered tooth 26e causes the master plate 156 to translate along the track axis A. The master plate 156 translates until the opposite side of the tooth 166a contacts the side surface 24e of the opening 24d of the moveable rail 24. This movement causes the drive tooth 166a to wedge between the side surface 24e of opening 24d and the side of the tapered tooth 26e of the rails 24 and 26, as indicated by arrows B. The wedging action of the drive tooth 166a with the opposing spaced apart sides 24e and tapered tooth 26e eliminates freeplay or relative movement between the rails 24 and 26.

The master plate 156 urges the slave plate 158 into the locked position by way of the drive element 156a. The drive tooth 168a of the slave plate 158 engages the openings 24d and 26d in a similar manner to the drive tooth 166a. Continued rotational movement causes engagement of the drive tooth 168a with the tapered sides of one of the teeth 26e of the stationary rail 26. This contact further causes the slave plate 158 to translate along track axis A relative to the master plate 156. Further engagement of the drive tooth 168a with one of the tapered teeth 26e causes the slave plate 158 to translate.

The drive tooth 168a then contacts the side surface 24e of one of the openings 24d formed in the U-shaped section 24a of the moveable rail 24. The drive tooth 168a is effectively pinched between at least one of the side surfaces 24e and at least one of the tapered sides of the teeth 26e. Thus, the pinched or wedged drive teeth 166a and 168a eliminate the freeplay condition between the moveable and stationary rails 24 and 26 along the track axis A.

The load teeth 168b of the slave plate 158 extend into to the openings 24d and 26d. The load teeth 166b and 168b are provided for load transfer in the event of a sufficiently high g-force event. During a sufficiently high g-force event, with the latch plate assembly 134 in the locked position, the drive teeth 166a and 168a that are in contact with the side walls 24e of openings 24d and the tapered teeth 26e may deflect from the shear loading of the moveable rail 24 moving relative to the stationary rail 26. As the teeth 166a and 168a deflect, the moveable and stationary rails 24 and 26 move relative to each other. As the rails move, the load teeth 166b and 68b make contact with the side walls 24e of openings 24d and the tapered teeth 26e and are similarly loaded. Thus, the drive teeth 166a and 168a function to actively engage the moveable and stationary rails 24 and 26 such that free play movement therebetween is eliminated. The load teeth 166b and 168b provide passive engagement with the moveable and stationary rails 24 and 26 to further distribute the loads of a high g-force event to other portions of the stationary rail 26 and the floor 12.

Referring now to FIGS. 10-13, there is illustrated another embodiment of a seat track latch assembly, shown generally at 230. As shown in FIG. 10, the seat track latch assembly 230 includes a first latch plate 234 and a second latch plate 236 that cooperate as an active track engagement side 238a. The seat track latch assembly 230 includes a third latch plate 240 that is configured as a passive track engagement side 238b. Active track engagement is defined as the interaction of portions of the first and second latch plates 234 and 236 with portions of the movable and stationary rails 24 and 26 such that relative movement between the rails 24 and 26 is eliminated. The elimination of relative movement may result from contact between portions of the rails 24 and 26 with projecting portions of the latch plates 234 and 236. Passive track engagement is defined as the interaction of the third latch plate 240 with portions of the movable and stationary rails 24 and 26 such that no substantial impediment to engagement of the latch plate 240 with the rails 24 and 26 results from the interaction therebetween.

The seat track latch assembly 230 includes a mounting plate 242 having a hinged end 244 and an actuating end 246. The hinged end 244 supports a release lever 248 for relative rotation to the mounting plate 242 by any suitable structure. The release lever 248 is operative to actuate the first, second, and third latch plates 234, 236, and 240 from a latched position to an unlatched position. The actuating end 246 may include a resilient member 250 to support and bias the release lever 248 in a latch engagement position. The first latch plate 234 is configured as a master plate and the second latch plate is configured as a slave plate, similar in form and function to the master and slave plates 56 and 58 described above.

The first, second, and third latch plates 234, 236, and 240 are supported for rotation relative to the mounting plate 242 by a hinge pin 252. In one embodiment, the first and second latch plates 234 and 236 are free to translate along a portion of the hinge pin 252. A first reaction member 254, illustrated as a first torsional coil spring, is engaged between the first latch plate 234 and the third latch plate 240. The first reaction member 254 has a first spring rate characteristic. A second reaction member 256, illustrated as a second torsional coil spring, is engaged between the second latch plate 36 and the third latch plate 240. The second reaction member 256 has a second spring rate characteristic that is different from the first spring rate characteristic, though such is not required. In a preferred embodiment, the first reaction member 254 is stiffer, i.e. produces a larger magnitude reaction load, than the second reaction member 256, however such is not required. The first and second reaction members 254 and 256 are not limited to torsional coil springs, as illustrated, and may be any resilient or load biasing structure.

The first latch plate 234 includes a plurality of teeth 258 that extend in a direction away from the hinge pin 252 and alternating spaces 260a and 260b. The plurality of first locking teeth 258 are shown having three teeth, however, any number of teeth may be used. In the illustrated embodiment, locking teeth 258 are shown having the same width-dimension. The alternating space 260a may be a different width dimension than alternating space 260b, though such is not required.

The second latch plate 236, likewise, is illustrated having a plurality of locking teeth 262 that extend in a direction away from the hinge pin 252. Alternating spaces 264a and 264b are located between the plurality of locking teeth 262. In the illustrated embodiment, locking teeth 262 are also the same width-dimension. The alternating space 264a of the second latch plate 236 is a different width dimension than the alternating space 264b (in the direction between adjacent teeth 262), though such is not required. Alternatively, the alternating spaces 260a and 260b of the first latch plate 234 may be the same size. In another alternative embodiment, the alternating spaces 264a and 264b of the second latch plate 36 may be the same size, if so desired. Alternatively, the teeth 258 and 262 may be of different widths and the spaces 260a, 260b, 264a, and 264b may be of the same width.

Figure 13:
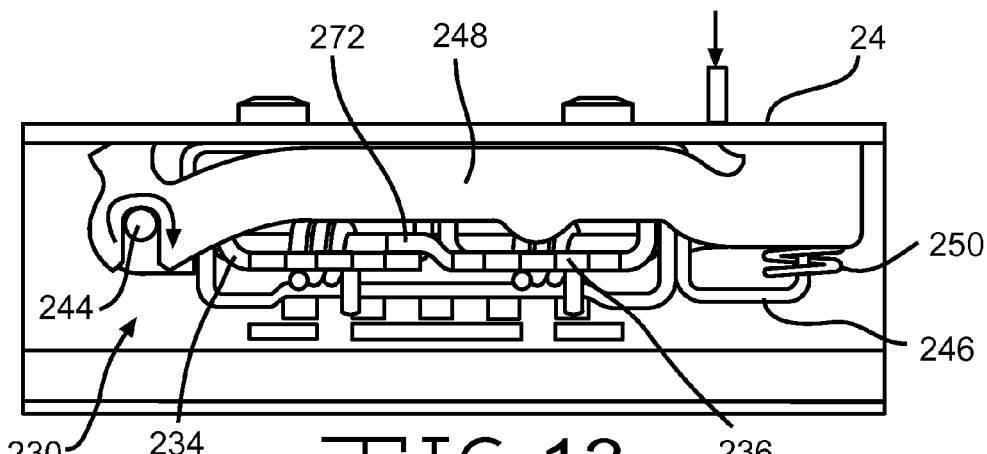
FIG. 13 is a side elevation view of an embodiment of a latch assembly including the latch plate assembly of FIG. 10

As shown in FIG. 13, the second latch plate 236 includes a driving element 272, similar in function to the driving element 56a described above. The driving element 272 extends over and into contact with the first locking plate 234. The driving element 272 is contacted by the first locking plate 234 and applies an additive force, generated by the first resilient member 254 during engagement, to the second locking plate 236. Such a force facilitates engagement of the teeth 262 with the movable and stationary rails 24 and 26. The driving element 272 further allows the release lever 248 to release both locking plates 234 and 236 with one point of contact. Alternatively the driving element 272 may be part of the first locking plate 234 and positioned under the second locking plate 236, if desired. In another alternative arrangement, the driving element 272 may be positioned to allow the second locking plate 236 to apply a force onto the first locking plate 234 during engagement, if so desired. The driving element 272 may also be optional and the release lever 248 may include separate points of contact to actuate the first and second locking plates 234 and 236.

The teeth 258 and 262 are illustrated extending in the same direction. A junction space 266 is provided between the second latch plate 236 and the first latch plate 234, though such a specific arrangement is not required. Though illustrated as part of the second latch plate 236, the junction space 266 may be provided as part of the first latch plate 234. The junction space 266 may be a different dimension than the alternating spaces 260a, 260b, and 264a, 264b or alternatively may be the same as one of the spaces 260a, 260b, and 264a, 264b. The junction space 266 may change width dimension in response to the relative translation of the first and second latch plates 234 and 236 along the hinge pin 252.

The third latch plate 240 includes a plurality of teeth 268, illustrated as five teeth, that extend in a direction away from the hinge pin 252. It should be understood that the third latch plate 240 may be more than one plate and may have any number of teeth 268 desired. The teeth 268 preferably extend in a generally opposite direction to that of teeth 258 and 262, though such is not required. A plurality of spaces 270 are disposed between adjacent teeth 268. The teeth 258, 262, and 268 are illustrated as having the same width, though such is not required. The spaces 270 may be the same width as any one of the spaces 260a, 260b, and 264a, 264b or may be a different width if so desired.

Figure 14:
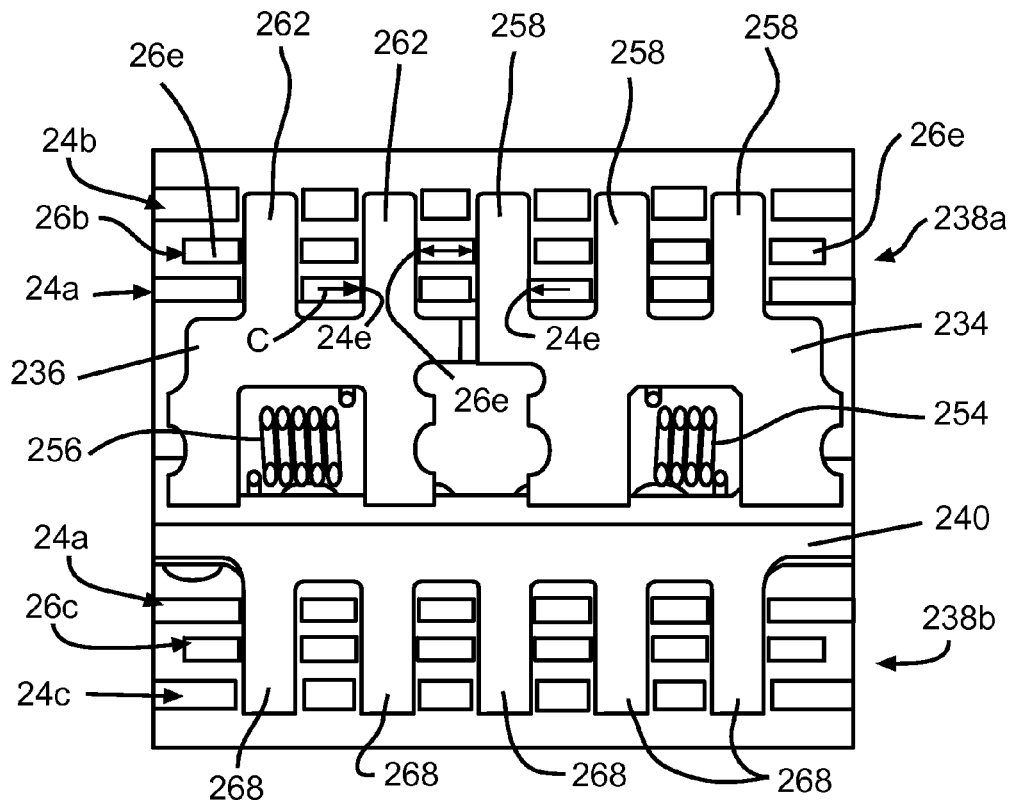
FIG. 14 is a top view, in partial cross section, of the seat latch of FIG. 10 in engagement with portions of the seat track.
Figure 15:
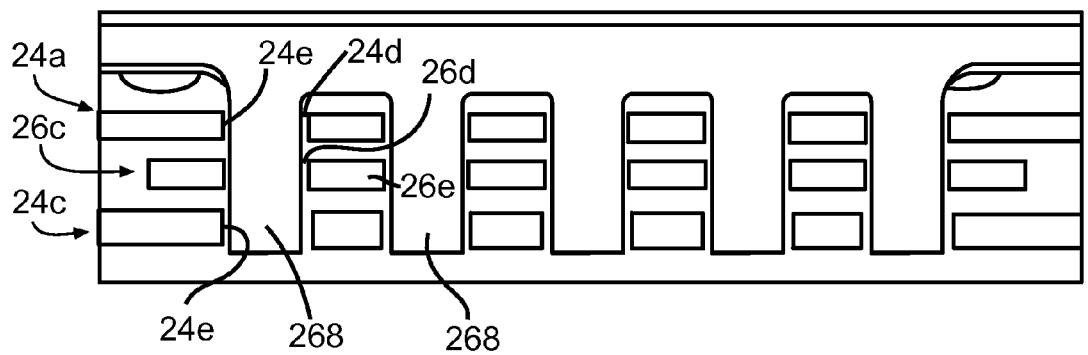
FIG. 15 is an enlarged view of FIG. 14 showing a portion of the seat latch engaged with the seat track.

Referring now to FIGS. 14 and 15, there is illustrated a schematic cross sectional view of the seat track latch assembly 230 shown in an engaged position within the moveable rail 24 and the stationary rail 26. The active track engagement side 238a of the moveable rail 24 includes the plurality of openings 24d formed through the U-shaped portion 24a and through the spaced-apart, upstanding walls 24b,c. The teeth 258 and 262 extend into the openings 24d and 26d of the moveable and stationary rails 24 and 26 when actuated into the locked position. At least one of the teeth 258 and at least one of the teeth 262 each contact one of the spaced apart side walls 24e of the openings 24d in the U-shaped portion 24a. The same teeth 258 and 262 additionally contact one of the tapered teeth 26e of the stationary rail 26, as indicated by arrows "C" when engaged in the locked position. The contact between the active side 238a of the latch plate assembly 234 and the openings 24d and 26d indicated by arrows C prevent freeplay or relative movement between the moveable rail 24 and the stationary rail 26.

As shown in FIG. 15, the passive side 238b of the latch plate assembly 234 engages portions of the moveable and stationary rails 24 and 26. The teeth 268 extend into the openings 24d formed through the U-shaped section 24a, the side opposite to the active side, and the opposing, outwardly positioned, and spaced-apart wall 24c. Though the passive side openings 24d are referenced as having the same configuration as the active side openings 24d, the windows may be configured differently if desired. As shown in FIG. 15, a gap may exist on both sides the teeth 268 relative to the openings 24d and 26d. This permits free movement of the third latch plate 240 of the passive side 238b to help provide full engagement of the teeth 268 when actuated into the latched position. Additionally, the teeth 268 are generally oriented nearly perpendicular relative to the adjacent sides of the openings 24d and 26d. Thus, load transfer during a high g-force event has a reduced impact at the base of the locking teeth 268. The engagement of the teeth 268 with the openings 24d and 26d of the passive side 238b provides a load sharing function, relative to the engaged active side 238a, during a high g-force event. This load sharing function allows for a reduced material thickness requirement for the movable and stationary rails 24 and 26, if desired.

Figure 11:
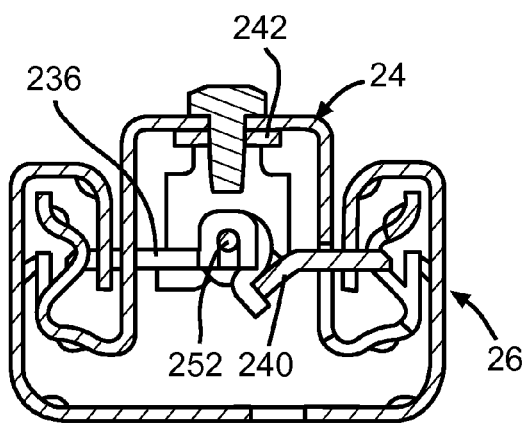
FIG. 11 is an end elevation view of a seat track assembly including the latch plate of FIG. 10 in a locked position.
Figure 12:
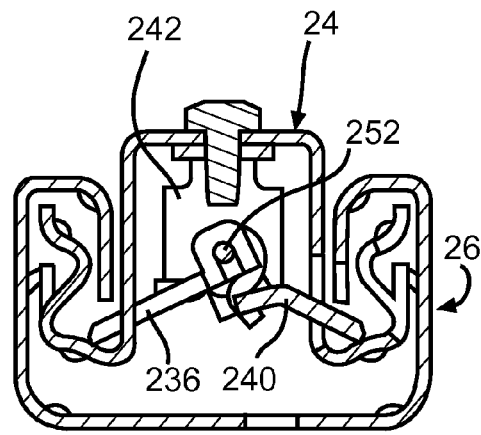
FIG. 12 is an end elevation view of a seat track assembly including the latch plate of FIG. 10 in a released position.

Referring now to FIGS. 11 and 12, the seat track latch assembly 230 is shown mounted to the upper portion of the U-shaped section 24a, which is also configured to be mounted to the seat 14. The latch plate assembly 230 is shown in the engaged or latched position in FIG. 11 and shown in the disengaged or unlatched position in FIG. 12. In the unlatched position, the first and second latch plates 234 and 236 are moved out of engagement with the teeth 26e of the stationary rail 26 on the active engagement side 238a. In a similar manner, the third locking plate 240 is also moved out of engagement with the teeth 26e of the stationary rail 26 on the passive engagement side 238b.

The locking plates 234, 236, and 240 are actuated by the release lever 248. When actuated, the release lever 248 rotates the locking plates 234, 236, and 240 about the hinge pin 252. As shown in FIG. 12, the first and second locking plates 234 and 236 are rotated together (i.e. simultaneously) and in an opposite direction of the rotation of the third locking plate 240. When the locking plates 234, 236, and 240 are actuated by the release lever 248, the movable rail 24 is permitted to translate or otherwise move relative to the stationary rail 26. When reengaged, as shown in FIG. 11, the movable rail 24 is restrained or otherwise prevented from translating relative to the stationary rail 26. As previously mentioned, the passive side plate 240 provides an additional load transfer function during a high g-force event, similar to the load teeth 166b and 168b, described above.

Figure 18:
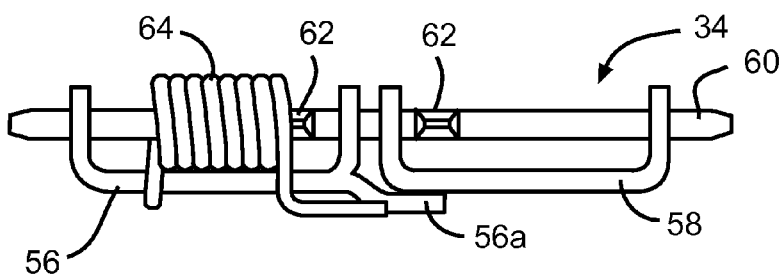
FIG. 18 is an elevational view of a latch plate assembly prior to installation in a seat track.
Figure 19:
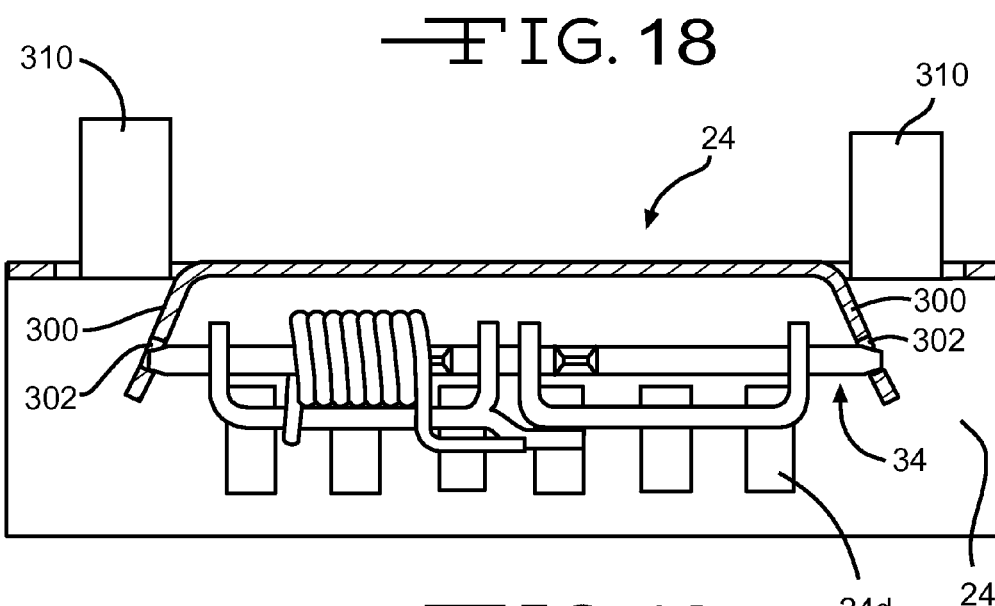
FIG. 19 is an elevational view of an intermediate step in a method of assembling the latch plate assembly of FIG. 18 to the seat track.
Figure 20:
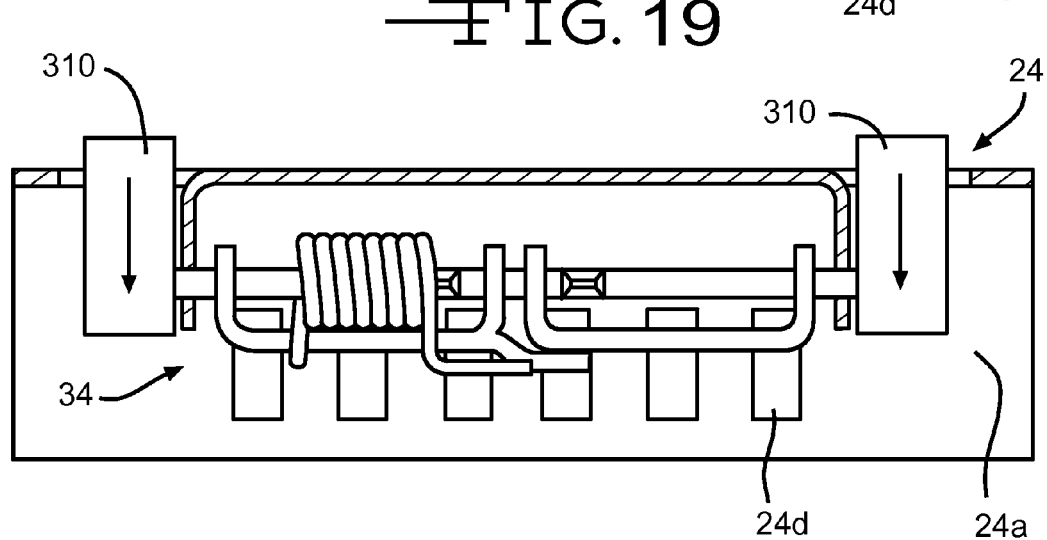
FIG. 20 is an elevational view of another step in the method of assembling the latch plate assembly of FIG. 18 to the seat track.
Figure 21:
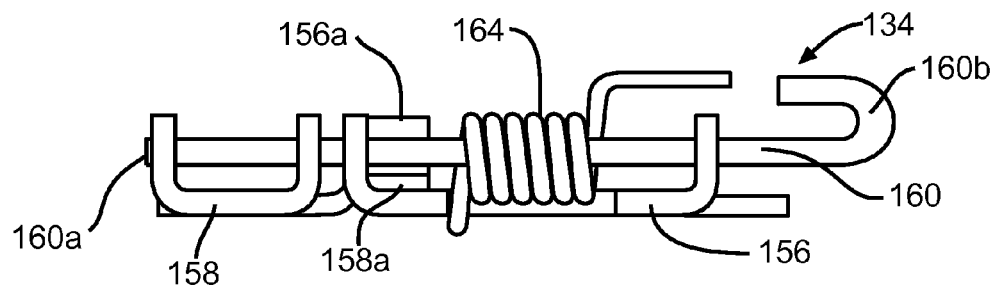
FIG. 21 is an elevational view of another embodiment of a latch plate assembly prior to installation in a seat track.

Referring now to FIGS. 18-20, there is illustrated an embodiment of a method of assembling the latch plate assembly 34 to the moveable rail 24. The latch plate assembly 34 is positioned within the U-shaped section 24a of the moveable rail 24. A pair of mounting tabs 300 are formed from the upper portion of the U-shaped section 24a. The mounting tabs 300 are shown as substantially identically shaped. However, the mounting tabs 300 may be shaped differently. The mounting tabs 300 may be formed by stamping, coining, cutting, milling, or other suitable processes. A hinge pin mounting aperture 302 is also formed through each of the mounting tabs 300. Die punches 310 are moved to fold or otherwise bend the tabs 300 such that the apertures 302 align with and engage the ends of the hinge pin 60. The tabs 300 are folded onto each end of the hinge pin 60 to trap or retain the latch plate assembly 34 therebetween. The ends of the hinge pin 60 may be tapered to facilitate engagement of the hinge pin 60 into the apertures 302.

In an alternative embodiment, the tabs 300 may be fully formed tabs that are subsequently attached to one of the moveable and stationary rails 24 and 26. The tabs 300 may be attached by any appropriate method or structure such as, for example, bolts, screws, adhesives, welds, and the like. Alternatively, the tabs 300 may also be formed as a single mounting structure that is attached in a similar manner to one of the rails.

In the embodiment illustrated in FIG. 20, the die punches continue through into the space under the U-shaped section 24a to fold the mounting tabs completely over. In addition, the die punches may upset or otherwise deform the ends of the hinge pins to form a positive retention feature thereon. In one embodiment, the positive retention feature may be flattened ends of the hinge pin 60. Alternatively, the hinge pin 60 may be positively retained by circlips, snap rings, spring clip, nuts, and the like. The hinge pin 60 may further not include any positive retention feature if desired.

Referring now to FIGS. 21-24, there is illustrated another embodiment of a method of assembling the latch plate assembly 134 to the moveable rail 24. Similar to the method described above, two mounting tabs 400 and 402 are formed. Mounting tab 400 is illustrated similar in shape to the mounting tabs 300 and includes a hinge pin mounting aperture 404. Mounting tab 402 is illustrated being folded in the same direction and orientation as mounting tab 400. The mounting tab 402 includes a J-hook mounting aperture 406 that is shown in a closer position to the top of the U-shaped section 24a than the hinge pin mounting aperture 404. The mounting tabs 400 and 402 are formed and bent into position prior to inserting the latch plate assembly 134 into the moveable rail 24.

Figure 22:
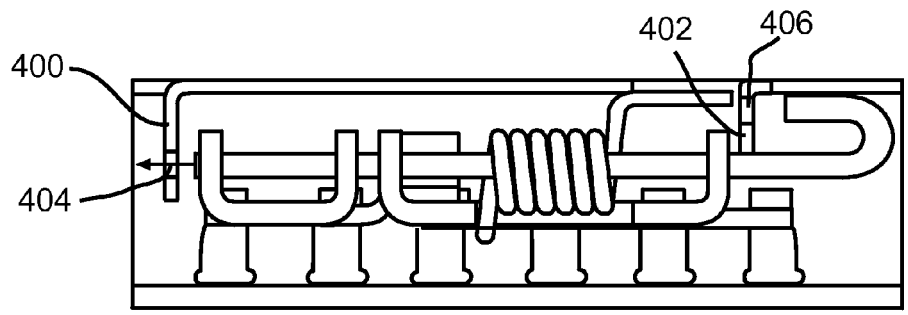
FIG. 22 is an elevational view of an alignment step in a method of assembling the latch plate assembly of FIG. 21 to the seat track.
Figure 23:
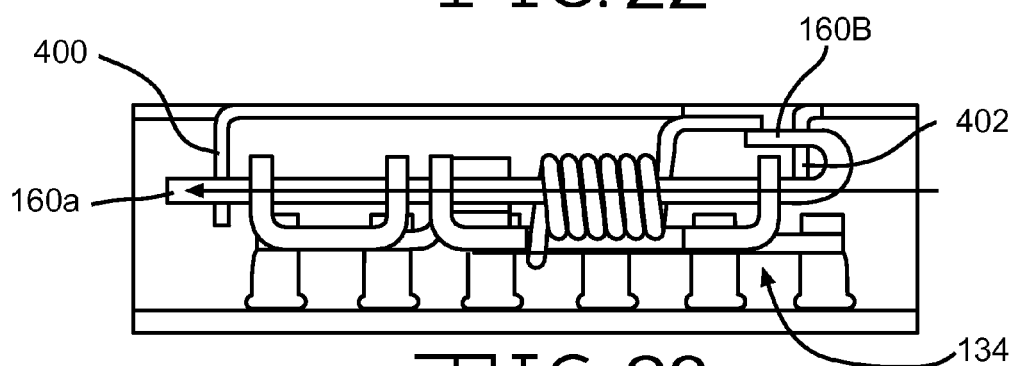
FIG. 23 is an elevational view of an installation step in a method of assembling the latch plate assembly of FIG. 21 to the seat track.
Figure 24:
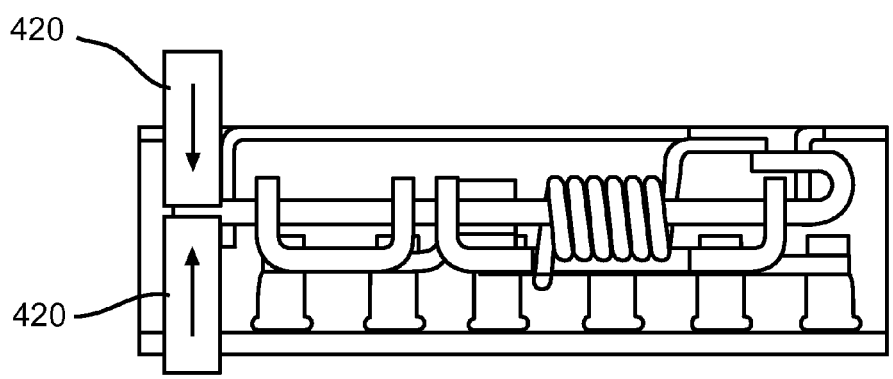
FIG. 24 is an elevational view of a securement step in a method of assembling the latch plate assembly of FIG. 21 to the seat track.

As shown in FIGS. 22 and 23, the latch plate assembly 134 is positioned within the moveable rail 24. The hinge pin end 160a is aligned with hinge pin mounting aperture 404 and the open end of the J-hook 160b is aligned with the J-hook mounting aperture 406. The hinge pin 160 is moved into engagement with the mounting apertures 404 and 406. The hinge pin end 16b extends beyond the mounting tab 400 such that a forming tool 420 may be moved to flatten or otherwise upset the hinge pin end 160a to prevent the hinge pin 160 from disengaging the mounting tabs 400 and 402. Alternatively, the hinge pin 160 may be mechanically retained as described above.

The principle and mode of operation of this invention have been explained and illustrated in its preferred embodiment. However, it must be understood that this invention may be practiced otherwise than as specifically explained and illustrated without departing from its spirit or scope. Furthermore, elements of the various embodiments of the invention may be combined and arranged in any suitable manner to provide embodiments of the invention not specifically described.

What is claimed is:

1. A seat adjustment apparatus comprising:
a first rail having a plurality of openings that extend along a longitudinal axis, the openings being defined by spaced-apart locking surfaces;
a second rail having a plurality of complementary openings extending along the longitudinal axis, the complementary openings being defined by spaced-apart locking surfaces; and
a locking mechanism having first and second locking portions, the first and second locking portions being selectively rotatable between a released position, where the first and second rails can move freely relative to one another along the longitudinal axis, and a locked position, where each of the first and second locking portions include a plurality of teeth extending into selected ones of the openings and complementary openings in the first and second rails to maintain the first rail in a selected position relative to the second rail,
the first and second locking portions being further configured for relative axial movement along the longitudinal axis as the locking mechanism is moved from the released position to the locked position such that at least one of the teeth of each of the first and second locking portions are engageable with a respective locking surface to attenuate longitudinal freeplay between the first and second rails.

2. The seat adjustment apparatus of claim 1 wherein the first and second locking portions are configured for independent relative longitudinal movement along the longitudinal axis, and wherein one of the teeth of the first locking portion engages one of the locking surfaces of one of the openings of the first rail and one of the teeth of the second locking portion engages another one of the locking surfaces of another one of the openings of the first rail causing relative axial movement along the longitudinal axis between the first and second locking portions.

3. The seat adjustment apparatus of claim 2 wherein the locking surfaces are spaced-apart side surfaces of openings and complementary openings of the first and second rails and the relative axial movement between the first and second locking portions permits the at least one tooth of the first locking portion that is in contact with the side surface of the opening of the first rail to contact an opposite, spaced-apart side surface of the complementary opening of the second rail and further permits the at least one tooth of the second locking portion that is in contact with the side surface of the other opening of the first rail to contact an opposite, spaced-apart side surface of the complementary opening of the second rail to eliminate the free play condition between the first rail and the second rail.

4. The seat adjustment apparatus of claim 2 wherein the relative axial movement between the first and second locking portions along the longitudinal axis permits another tooth of the first locking portion to contact a side surface of another complementary opening of the second rail and further permits another tooth of the second locking portion to contact a side portion of another complementary opening of the second rail to eliminate the free play condition between the first rail and the second rail.

5. The seat adjustment apparatus of claim 1 wherein the second rail is a stationary rail configured to engage a portion of a vehicle and the first rail is a moveable rail configured to support a seat for relative movement with the portion of the vehicle and wherein the plurality of complementary openings of the second rail are defined by a plurality of teeth that alternate with the plurality of openings, the teeth being formed along the longitudinal axis and including the spaced-apart locking surfaces, the locking surfaces further being tapered such that the teeth have a base that is wider than an open distal end.

6. The seat adjustment apparatus of claim 5 wherein as the first and second locking portions are moved from the released position to the locked position at least one tooth of the first locking portion contacts the tapered tooth of the second rail causing the axial movement along the longitudinal axis relative to the second locking portion.

7. The seat adjustment apparatus of claim 6 wherein the at least one tooth of the first locking portion is a drive tooth configured to contact one of the tapered teeth of the stationary rail and at least one other tooth of the first locking portion is a load tooth configured to clear at least one of the tapered teeth of the second rail and the locking sides of the first rail.

8. The seat adjustment apparatus of claim 7 wherein the first locking portion includes a second load tooth and the spacing between the drive tooth and the adjacent load tooth is different than the spacing between adjacent load teeth.

9. The seat adjustment apparatus of claim 1 wherein the first locking portion is a master plate and the second locking portion is a slave plate, the master plate including a driving element that engages the slave plate such that the master plate rotates the slave plate into engagement with the openings and complementary openings of the first and second rails as the latch assembly is rotated into the locked position.

10. The seat adjustment apparatus of claim 9 wherein a resilient member biases the master plate into engagement with the openings and complementary openings of the first and second rails.

11. The seat adjustment apparatus of claim 9 wherein the master and slave plates are mounted on a hinge pin for pivotal movement, one of the moveable and stationary rail having at least one integrally formed mounting tab configured to support the hinge pin.

12. The seat adjustment apparatus of claim 1 wherein the first locking portion is a master plate that includes a driving element and the second locking portion is a slave plate that includes a driven element, the master plate driving element engages the slave plate driven element such that the master plate rotates the slave plate into and out of engagement with the openings and complementary openings of the first and second rails.

13. The seat adjustment apparatus of claim 1 wherein the first and second locking portions are rotated out of engagement by an actuation mechanism that is mounted within the first rail.

14. The seat adjustment apparatus of claim 13 wherein the actuation mechanism includes a pair of spaced-apart pivot points that are pivotally mounted on the first rail, the actuation mechanism further including a handle mount portion having a pivot retaining portion, the handle mount portion configured to engage an actuation handle that cooperates with the pivot retaining portion such that the pivot points remain pivotally mounted to the first rail.

15. The seat adjustment apparatus of claim 1 wherein the locking mechanism includes a third locking portion that extends in a generally opposite direction to the first and second locking portions when moved to the locked position.

16. A seat adjustment apparatus comprising:
a first rail having a plurality of complementary openings extending along the longitudinal axis, the complementary openings being defined by generally parallel spaced-apart surfaces;
a second rail having a plurality of alternating openings and teeth having tapered spaced-apart surfaces that define the openings; and
a locking mechanism having first and second locking portions, the first and second locking portions being selectively moveable between a released position where the first and second rails can move freely relative to one another along the longitudinal axis, and a locked position where the first and second locking portions include teeth extending into the selected openings and complementary openings in the first and second rails to maintain the first rail in a selected position relative to the second rail,
the first and second locking portions being further configured for relative axial movement along the longitudinal axis as the locking mechanism is moved from the released position to the locked position such that at least one of the teeth of each of the first and second locking portions are engageable with at least one of the parallel spaced-apart surfaces of the first rail teeth and at least one of the generally tapered spaced-apart side surfaces of the second rail to attenuate longitudinal freeplay between the first and second rails.

17. The seat adjustment apparatus of claim 16 wherein the locking mechanism includes a third locking portion that extends in a generally opposite direction to the first and second locking portions when moved to the locked position.

18. The seat adjustment apparatus of claim 17 wherein the locking mechanism includes a first resilient member having a first spring rate characteristic that is disposed between the first and third locking portions and a second resilient member having a second spring rate characteristic that is disposed between the second and third locking portions, the first spring rate characteristic being different than the second spring rate characteristic.

19. A vehicle seat assembly comprising:
a seat having a seat back and a seat bottom;
a seat adjustment apparatus having a stationary rail configured to engage a portion of a vehicle, the stationary rail having a plurality of tapered teeth and a moveable rail connected to the seat bottom, the moveable rail having a plurality of openings defined by spaced-apart locking surfaces, the stationary and moveable rails being engaged for selective relative axial movement along a longitudinal axis; and
a locking mechanism having a master plate that includes at least one drive tooth and at least one load tooth, the at least one drive tooth being configured to engage one of the tapered teeth and the spaced-apart locking surfaces and the at least one load tooth having a clearance relationship with at least one of the tapered teeth and the locking surfaces, and a slave plate having at least one drive tooth and at least one load tooth, the master and the slave plates being selectively moveable between a released position where the stationary and moveable rails can move freely relative to one another along the longitudinal axis, and a locked position where the master and slave plates maintain the moveable rail in a selected position relative to the stationary rail, the master and slave plates being further configured for relative axial movement along the longitudinal axis as the locking mechanism is moved from the released position to the locked position such that at least one of the teeth of each of the master and slave plates are engageable with at least one of the tapered teeth and the locking surfaces to attenuate longitudinal freeplay between the moveable and stationary rails.

20. The vehicle seat assembly of claim 19 wherein the master and slave plates are configured for independent relative longitudinal movement along the longitudinal axis and a third plate extends in a generally opposite direction to the master and slave plates when moved to the locked position, the third plate having teeth that extend into openings between the tapered teeth of the stationary rail and extend into the openings of the moveable rail, the third plate teeth forming a clearance relationship relative to one of the tapered teeth of the stationary rail and the locking surfaces of the moveable rail.

* * * * *